(12) United States Patent
Asaba et al.

(10) Patent No.: US 9,392,142 B2
(45) Date of Patent: Jul. 12, 2016

(54) IMAGING SENSOR, IMAGE READING DEVICE, IMAGE FORMING APPARATUS, AND ALIGNMENT METHOD OF IMAGING SENSOR

(71) Applicants: Naoki Asaba, Kanagawa (JP); Yoshio Konno, Kanagawa (JP); Masamoto Nakazawa, Kanagawa (JP)

(72) Inventors: Naoki Asaba, Kanagawa (JP); Yoshio Konno, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/600,573

(22) Filed: Jan. 20, 2015

(65) Prior Publication Data

US 2015/0222790 A1    Aug. 6, 2015

(30) Foreign Application Priority Data

Feb. 4, 2014 (JP) .................... 2014-019840

(51) Int. Cl.
*H04N 1/04* (2006.01)
*H04N 1/48* (2006.01)
*H04N 9/04* (2006.01)
*H04N 1/401* (2006.01)
*H04N 5/335* (2011.01)

(52) U.S. Cl.
CPC .............. *H04N 1/486* (2013.01); *H04N 1/401* (2013.01); *H04N 5/335* (2013.01); *H04N 9/045* (2013.01)

(58) Field of Classification Search
CPC ....... H04N 1/486; H04N 1/401; H04N 80/45; H04N 5/335
USPC .................. 358/513, 474, 498, 497
See application file for complete search history.

(56) References Cited

U.S. PATENT DOCUMENTS

| | | | |
|---|---|---|---|
| 2006/0180742 A1 | 8/2006 | Kwon | |
| 2007/0085921 A1* | 4/2007 | Kitagata | H04N 5/23245 348/308 |
| 2007/0188638 A1 | 8/2007 | Nakazawa et al. | |
| 2008/0252787 A1 | 10/2008 | Nakazawa et al. | |
| 2010/0013867 A1* | 1/2010 | Kim | G09G 3/3233 345/690 |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2012/0008173 A1 | 1/2012 | Konno et al. | |
| 2012/0092732 A1 | 4/2012 | Nakazawa | |
| 2012/0224205 A1 | 9/2012 | Nakazawa | |
| 2013/0063792 A1 | 3/2013 | Nakazawa | |
| 2014/0029065 A1 | 1/2014 | Nakazawa | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2014/0368893 A1 | 12/2014 | Nakazawa et al. | |

FOREIGN PATENT DOCUMENTS

| | | |
|---|---|---|
| JP | 2006-229935 | 8/2006 |
| JP | 2008-228000 | 9/2008 |

\* cited by examiner

*Primary Examiner* — Houshang Safaipour
(74) *Attorney, Agent, or Firm* — Oblon, McClelland, Maier & Neustadt, L.L.P

(57) ABSTRACT

An imaging sensor includes multiple light-receiving elements, which are for multiple colors, configured to conduct photoelectric conversion and multiple power supply lines configured to supply a power supply voltage from a power supply source to the light-receiving elements. The light-receiving elements of each of the colors are aligned in one direction. Portions extending between the power supply source and the respective light-receiving elements of the multiple power supply lines are substantially identical in shape on at least a per-color basis.

19 Claims, 7 Drawing Sheets

IMAGING SENSOR, IMAGE READING DEVICE, IMAGE FORMING APPARATUS, AND ALIGNMENT METHOD OF IMAGING SENSOR

CROSS-REFERENCE TO RELATED APPLICATIONS

The present application claims priority to and incorporates by reference the entire contents of Japanese Patent Application No. 2014-019840 filed in Japan on Feb. 4, 2014.

BACKGROUND OF THE INVENTION

1. Field of the Invention

Embodiments of the present invention relate generally to an imaging sensor, an image reading device, an image forming apparatus, and an alignment method of an imaging sensor.

2. Description of the Related Art

Some type of scanners includes a photoelectric conversion element which conducts photoelectric conversion of light reflected from an original document and outputs an analog image signal, an analog processing unit which performs processing, such as A/D (analog-to-digital) conversion, on the analog image signal to obtain digital image data, an image correcting unit which performs various corrections on the digital image data, and an image transfer unit which transfers the image data downstream by LVDS (low voltage differential signaling) transmission or the like.

As the photoelectric conversion element, CCD (charge coupled device) has conventionally been widely used. However, recent demands for reducing power consumption turn spotlight on CMOS (complementary metal oxide semiconductor) linear image sensors. CMOS linear image sensors are analogous to CCDs in conducting photoelectric conversion of incident light using photodiodes (light-receiving elements).

However, unlike a CCD which transfers charges using a shift register and, after transferring the charges, conducts charge-voltage conversion in a change detecting unit, a CMOS linear image sensor converts charges in a charge detecting unit in a pixel into a voltage signal and outputs the voltage signal downstream via a switch and an analog bus after buffering the voltage signal in an output buffer. CMOS linear image sensors are known to consume less power than CCDs because a CMOS linear image sensor requires only the switch as a load to be driven.

Meanwhile, Japanese Laid-open Patent Application No. 2006-229935 discloses an image sensor including a pixel array unit made up of multiple unit pixels arranged in a matrix array and multiple power supply lines arranged on the pixel array unit to supply a power supply voltage to the unit pixels. The power supply lines are arranged in a direction, in which the pixel array unit outputs video signals and which intersects a scan direction.

However, conventional CMOS linear image sensors are disadvantageous for the reason described below. Power supply lines are formed to extend in a direction in which rows of pixels of respective colors lie. A power supply voltage is supplied to one end of each of the pixel rows of the respective colors. Accordingly, drop in the power supply voltage supplied to light-receiving elements undesirably increases with the distance from the one end of the pixel row and, as a result, unwanted homogeneity is developed in image data.

Therefore, it is desirable to provide an imaging sensor an image reading device, and an image forming apparatus capable of preventing variation of power supply voltage supplied to light-receiving elements, the variation depending on a position of a pixel of each color.

SUMMARY OF THE INVENTION

It is an object of the present invention to at least partially solve the problems in the conventional technology.

According to an aspect of the present invention, there is provided an imaging sensor including: multiple light-receiving elements for multiple colors configured to conduct photoelectric conversion, the light-receiving elements of each of the colors being aligned in one direction; and multiple power supply lines configured to supply a power supply voltage from a power supply source to the light-receiving elements, wherein portions of the multiple power supply lines, the portions extending between the power supply source and the respective light-receiving elements, are substantially identical in shape on at least a per-color basis.

According to another aspect of the present invention, there is provided an alignment method of an imaging sensor, the imaging sensor including multiple light-receiving elements for multiple colors configured to conduct photoelectric conversion, the light-receiving elements of each of the colors being aligned in one direction, and multiple power supply lines configured to supply a power supply voltage from a power supply source to the light-receiving elements, wherein portions of the multiple power supply lines, the portions extending between the power supply source and the respective light-receiving elements, are substantially identical in shape on at least a per-color basis.

According to still another aspect of the present invention, there is provided an imaging sensor including: multiple light-receiving means for multiple colors configured to conduct photoelectric conversion, the light-receiving means of each of the colors being aligned in one direction; and multiple power supply means configured to supply a power supply voltage from a power supply source to the light-receiving means, wherein portions of the multiple power supply means, the portions extending between the power supply source and the respective light-receiving means, are substantially identical in shape on at least a per-color basis.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
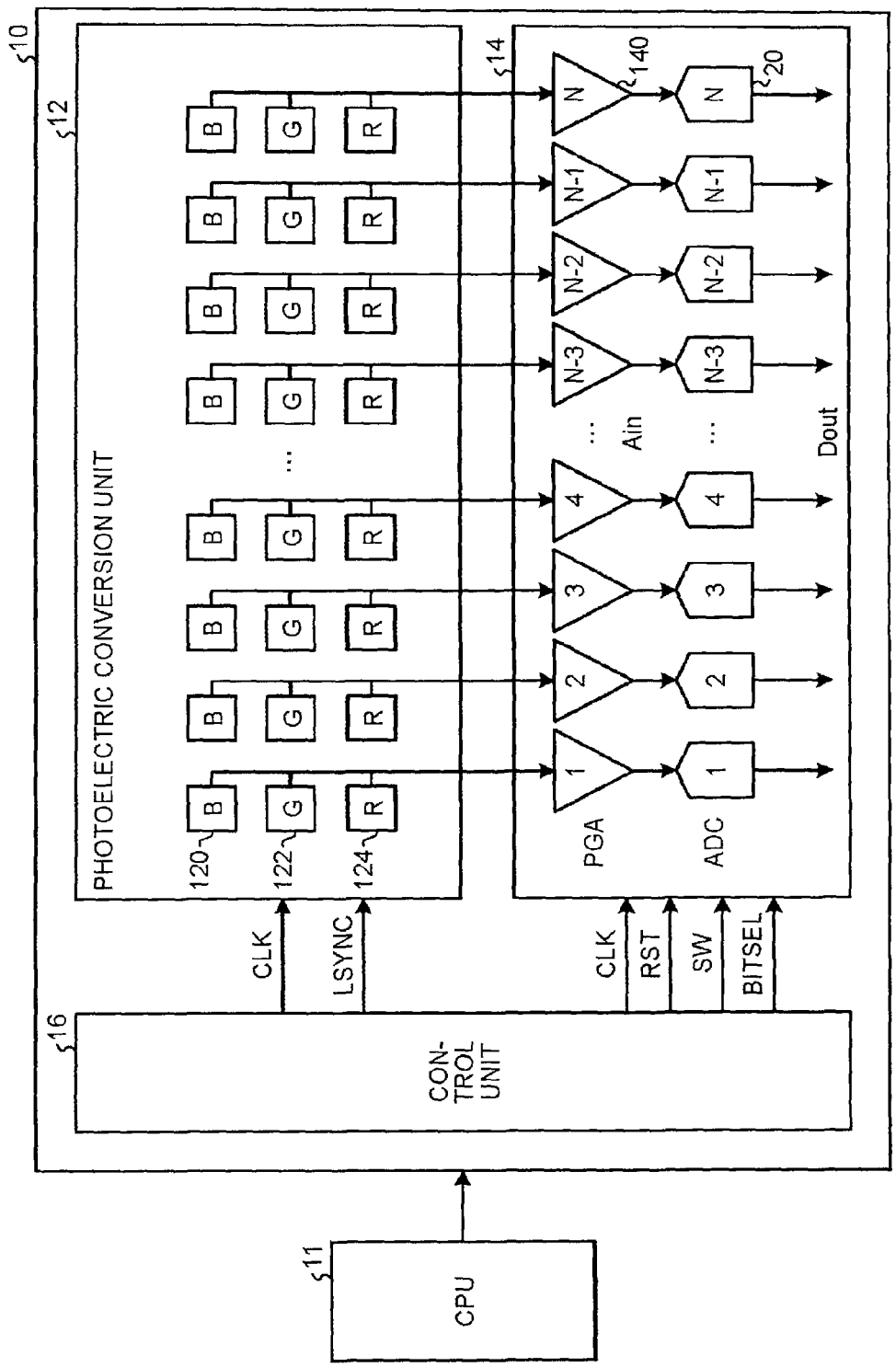
FIG. 1 is a configuration diagram illustrating a configuration of an imaging sensor mounted on an image forming apparatus or the like and a component around the image sensor.

Exemplary embodiments of the present invention are described in detail below with reference to the accompanying drawings. FIG. 1 is a configuration diagram illustrating a configuration of an imaging sensor 10 mounted on an image reading device, an image forming apparatus, or the like and a component around the imaging sensor 10. The imaging sensor 10 is a CMOS color linear image sensor of a type which outputs digital signals. The imaging sensor 10 operates under control of a CPU (central processing unit) 11.

As illustrated in FIG. 1, the imaging sensor 10 includes, for example, a photoelectric conversion unit 12, a signal processing unit 14, and a control unit 16. The photoelectric conversion unit 12 includes a row of N (1 to n) light-receiving elements (photodiodes) 120 for B (blue), a row of N light-receiving elements 122 for G (green), and a row of N light-receiving elements 124 for R (red) (color separation is performed using a not-shown filter). The light-receiving elements of each row are aligned in one direction. The imaging sensor 10 has the following configuration. A single column is made up of three light-receiving elements, which are the light-receiving element 120 for B, the light-receiving element 122 for G, and the light-receiving element 124 for R. Each of the columns outputs a photoelectric-converted signal. Hereinafter, the direction in which each of the rows of the light-receiving elements 120, 122, and 124 is aligned may be sometimes referred to as the main-scanning direction of the imaging sensor 10 mounted on an image reading device (otherwise simply referred to as "the main-scanning direction").

The signal processing unit 14 includes N PGAs (programmable gain amplifiers (amplifying units)) 140 and N A/D converters (ADCs) 20. The signal processing unit 14 amplifies analog signals output from the photoelectric conversion unit 12 on a column-by-column basis, converts the analog signals into digital signals, and outputs the digital signals. Hereinafter, substantially identical elements are denoted by like reference numerals.

Figure 2:
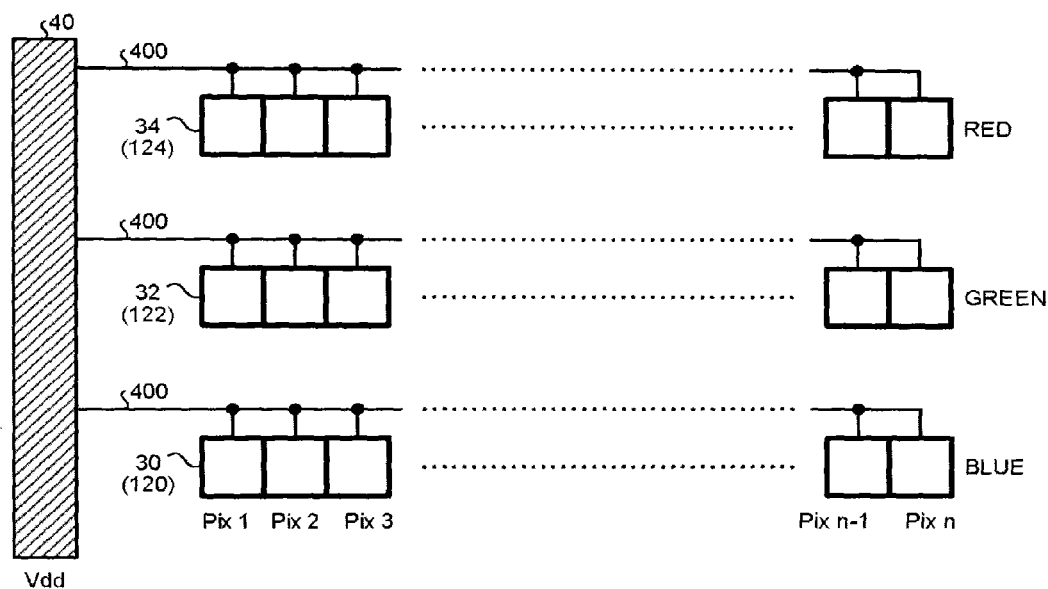
FIG. 2 is a diagram illustrating power supply lines in an imaging sensor of a comparative example.

Power supply lines in a chip which supply a power supply voltage to each of pixels (each including a light-receiving element) in the imaging sensor 10 are described below. Power supply lines in a CMOS linear image sensor (imaging sensor) of a comparative example are described first. FIG. 2 is a diagram illustrating the power supply lines in the imaging sensor of the comparative example. Note that control signal lines and the like are omitted from FIG. 2.

As illustrated in FIG. 2, the imaging sensor of the comparative example includes a row of N (1 to n) pixels 34 (the light-receiving elements 124) for R, a row of N pixels 32 (the light-receiving elements 122) for G, and a row of N pixels 30 (the light-receiving elements 120) for B. The light-receiving elements are aligned in one direction on a per-color basis. A power supply source 40 has an area and a width that are large enough to cause substantially no position-dependent variation in voltage in the image sensor (chip). The power supply source 40 supplies an externally-supplied power supply voltage (Vdd) substantially equally within the chip. Each of the rows of the N pixels 30, the N pixels 32, and the N pixels 34 receives supply of the power supply voltage via power supply lines 400 on the per-color basis.

An nth (from the power supply source 40) pixel is denoted as "Pix n" in FIG. 2. The number of pixels N in the main-scanning direction depends on a desired scan size and a desired scan resolution of an image reading device. For example, approximately 700 pixels (N=700) are required to read an original document of A3 size which is 297 mm on short side with a resolution of 600 dpi (dots per inch). The imaging sensor 10 includes the three pixel rows or, more specifically, the row for red, the row for green, and the row for blue, in the sub-scanning direction of the imaging sensor 10 in the state mounted on an image reading device.

As illustrated in FIG. 2, the power supply voltage is supplied to each of the one ends in the main-scanning direction of the rows of the pixels 30, 32, and 34. In this state, impedance of the power supply line 400 is low at pixels close to the power supply source 40 or, more specifically, at Pix 1 or Pix 2, but the impedance increases with the distance from the power supply source 40. Accordingly, voltage drop increases with the distance from the power supply source 40.

Figure 3:
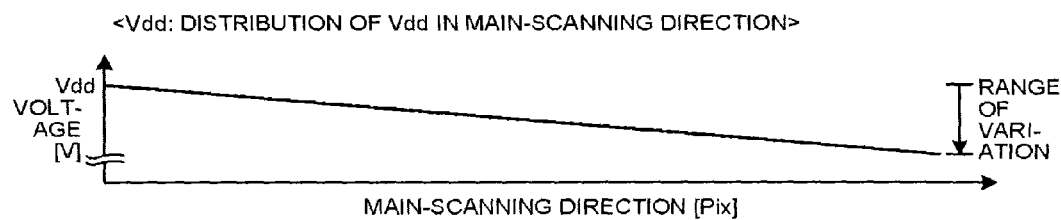
FIG. 3 is a graph illustrating distribution in the main-scanning direction of a power supply voltage in the imaging sensor of the comparative example illustrated in FIG. 2.

FIG. 3 is a graph illustrating distribution in the main-scanning direction of the power supply voltage Vdd in the imaging sensor of the comparative example illustrated in FIG. 2. As illustrated in FIG. 3, the power supply voltage Vdd drops toward the other end in the main-scanning direction in the imaging sensor of the comparative example illustrated in FIG. 2. Put another way, pixel characteristics can change (degrade) dependent on the power supply voltage, which causes heterogeneity to be undesirably developed in image data in the main-scanning direction with the drop in the power supply voltage Vdd. If the power supply lines are configured in the sub-scanning direction as in the main-scanning direction, the power supply voltage Vdd will exhibit similar distribution to that illustrated in FIG. 3 also in the sub-scanning direction.

Figure 4:
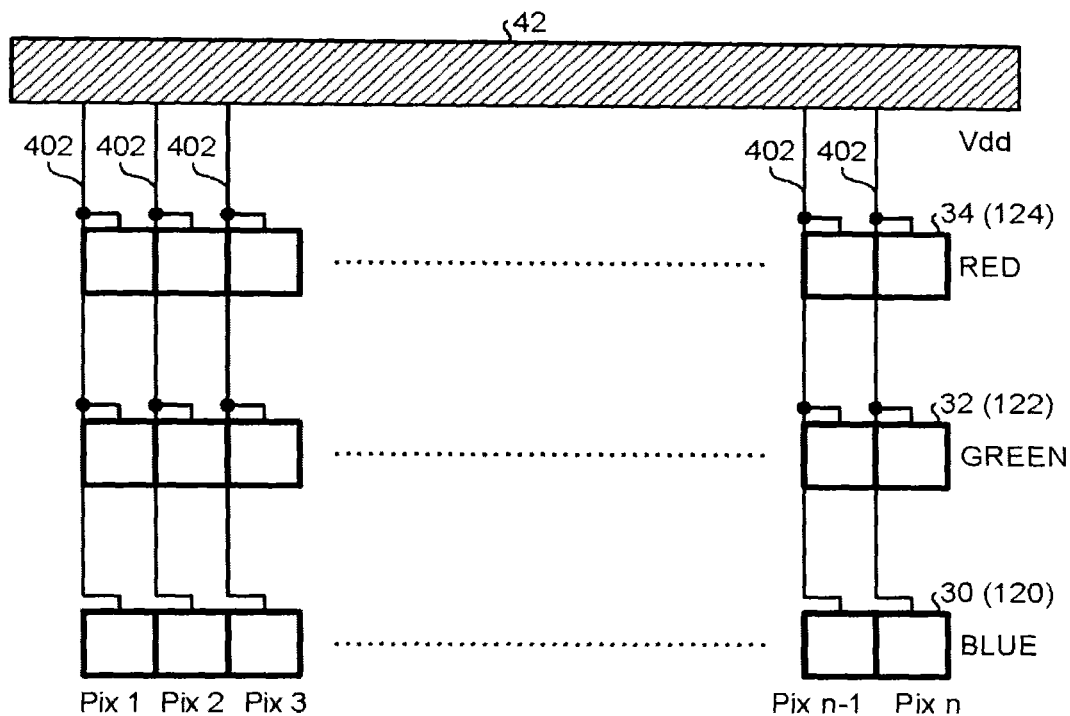
FIG. 4 is a diagram illustrating a first example of power supply lines in an imaging sensor according to an embodiment.

Power supply lines in the imaging sensor 10 according to an embodiment are described below. FIG. 4 is a diagram illustrating a first example of the power supply lines in the imaging sensor 10 according to an embodiment. Note that control signal lines and the like are omitted from FIG. 4.

The first example of the power supply lines in the imaging sensor 10 includes a power supply source 42 which is substantially equal to the imaging sensor 10 in length in the main-scanning direction to cause power supply lines 402 for the pixels 30, 32, and 34 to be equal to each other in length, on a per-color basis, at any pixel position in the main-scanning direction. It is assumed that each of the power supply source 42 and the like has an area and a width that are large enough to cause substantially no position-dependent variation in voltage in the imaging sensor (chip) and supplies the externally-supplied power supply voltage (Vdd) substantially equally within the chip.

The number of the power supply lines 402 is N, which is the same as the number of the pixels 30, 32, and 34 in each row in the main-scanning direction. The power supply lines 402 are formed so that portions of the power supply lines 402 between the power supply source 42 and the respective pixels 30, 32, 34 (the light-receiving elements 120, 122, 124) are substantially identical in shape on the per-color basis. Each of the power supply lines 402 is formed to extend from an end of the power supply source 42, which is substantially parallel to the main-scanning direction, in a direction substantially orthogonal to the main-scanning direction.

Therefore, the pixels 30, 32, and 34, the number of each of which is N, are identical in length of the power supply lines 402 from the power supply source 42 on a per-color basis. Because the power supply lines 402 thus have substantially same line impedance, the power supply voltage is homogeneously distributed in the main-scanning direction.

Figure 5:
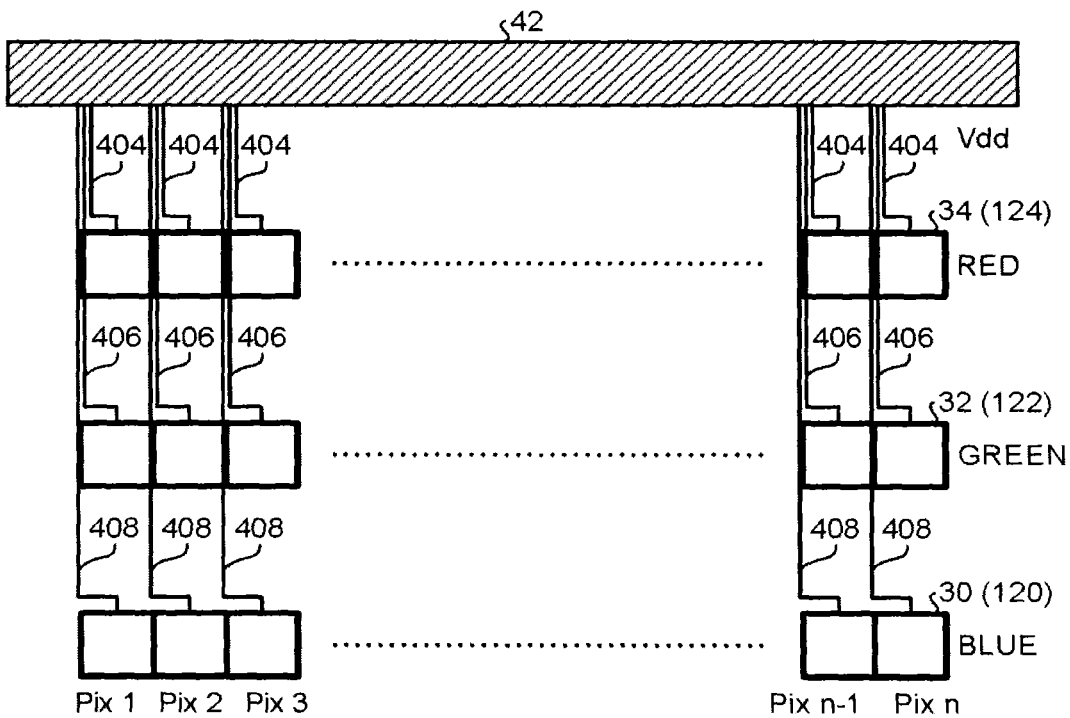
FIG. 5 is a diagram illustrating a second example of the power supply lines in the imaging sensor according to the embodiment.

FIG. 5 is a diagram illustrating a second example of the power supply lines in the imaging sensor 10 according to the embodiment. Note that control signal lines and the like are omitted from FIG. 5.

In the second example of the power supply lines in the imaging sensor 10, power supply lines 404, 406, and 408 from the power supply source 42 to the pixels 34, 32, and 30, respectively, are arranged independent of each other. The power supply lines 404, 406, and 408 extending from the power supply source 42 to the pixels 34, 32, and 30 (the light-receiving elements 124, 122, and 120), respectively, are formed to be substantially identical in shape on the per-color basis. Each of the power supply lines 404, 406, and 408 is formed to extend from an end of the power supply source 42, which is substantially parallel to the main-scanning direction, in a direction substantially orthogonal to the main-scanning direction.

Thus, the second example of the power supply lines in the imaging sensor 10 is advantageous in that, even if electricity is consumed by pixels of one color, electric current to be consumed by the pixels does not flow to power supply lines for the other colors. In short, the second example of the power supply lines in the imaging sensor 10 is capable of preventing crosstalk between different colors.

Figure 6:
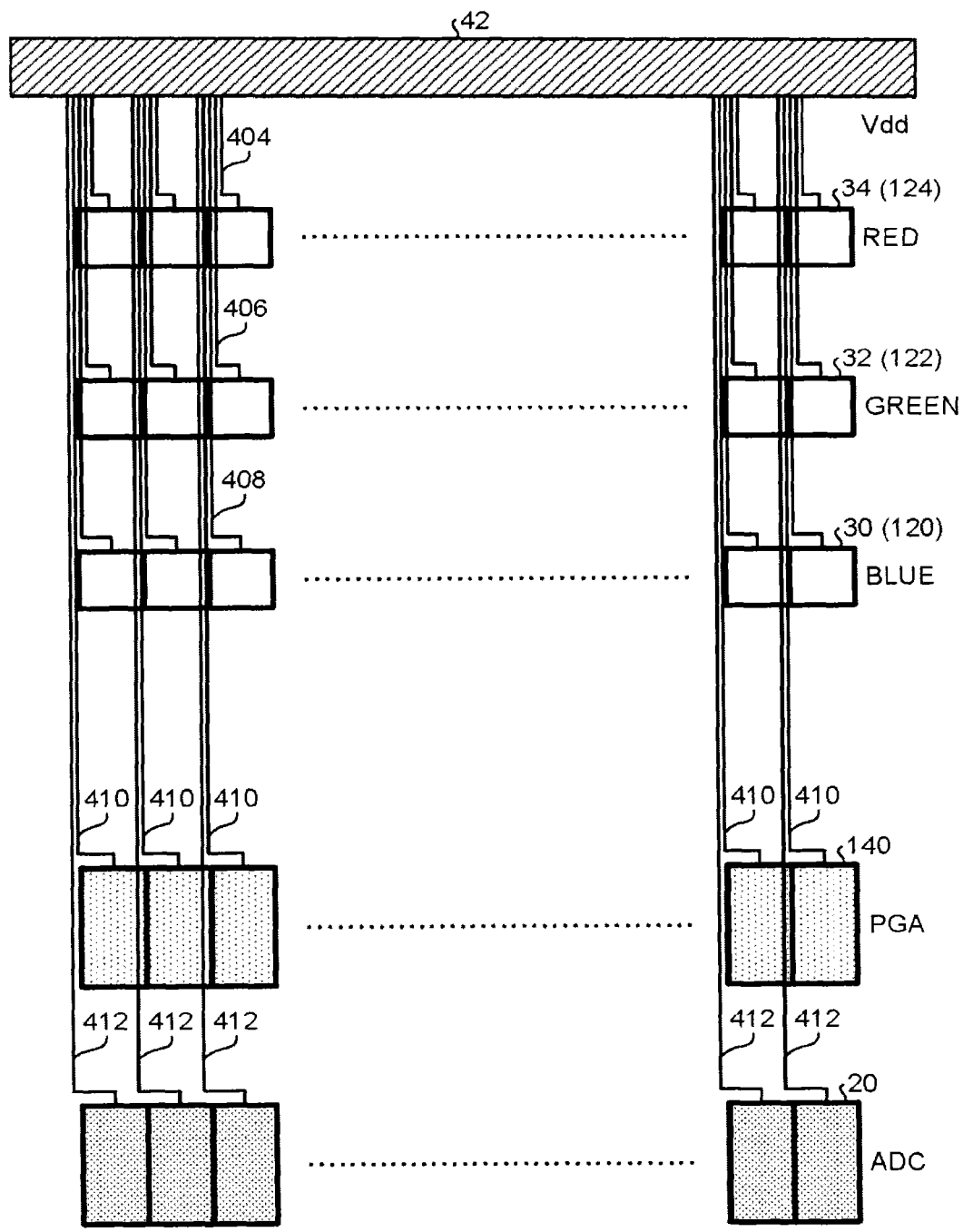
FIG. 6 is a diagram illustrating a third example of the power supply lines in the imaging sensor according to the embodiment.

FIG. 6 is a diagram illustrating a third example of the power supply lines in the imaging sensor 10 according to the embodiment. Note that control signal lines and the like are omitted from FIG. 6.

The third example of the power supply lines in the imaging sensor 10 includes, in addition to and individually apart from the configuration of the second example of the power supply lines in the imaging sensor 10, power supply lines 410 for each of the amplifying units 140 and power supply lines 412 for each of the A/D converters 20. The power supply lines 410 extending from the power supply source 42 to the amplifying units 140 are formed to be substantially identical to each other in shape. The power supply lines 412 extending from the power supply source 42 to the A/D converters 20 are formed to be substantially identical to each other in shape. Each of the power supply lines 410 and 412 is formed to extend from the end of the power supply source 42, which is substantially parallel to the main-scanning direction, in a direction substantially orthogonal to the main-scanning direction.

Figure 7:
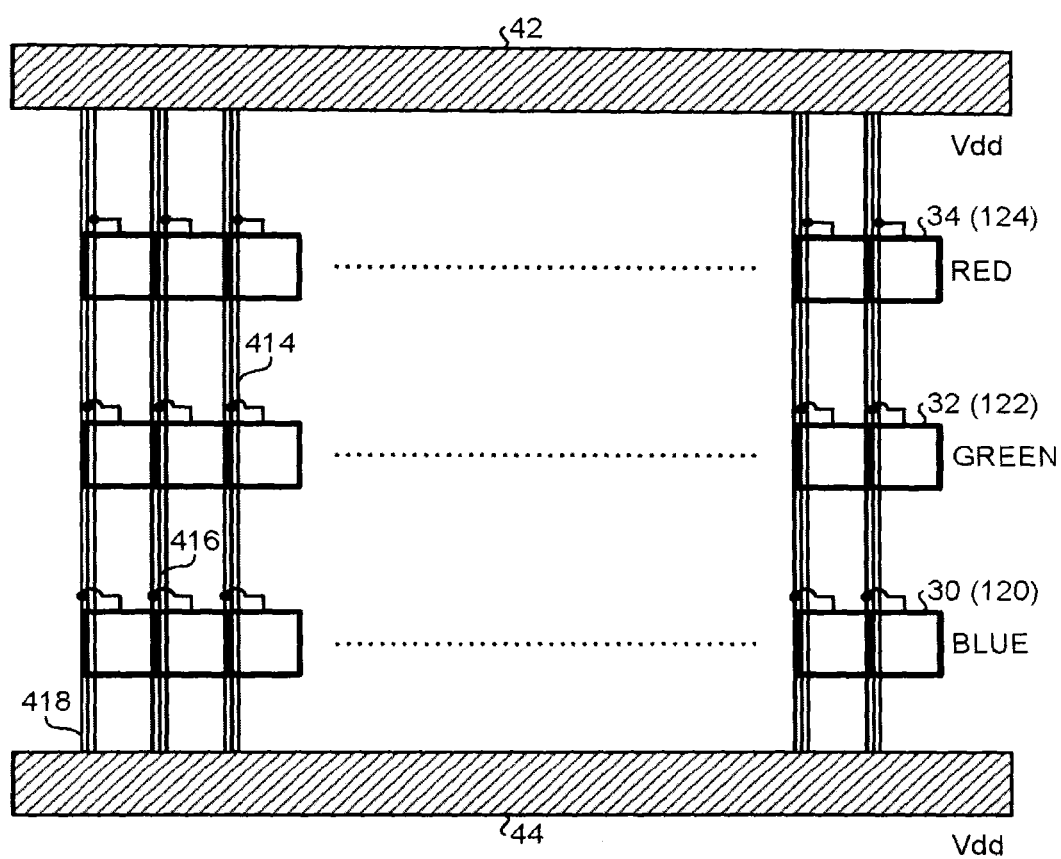
FIG. 7 is a diagram illustrating a fourth example of the power supply lines in the image sensor according to the embodiment.

FIG. 7 is a diagram illustrating a fourth example of the power supply lines in the imaging sensor 10 according to the embodiment. Note that control signal lines and the like are omitted from FIG. 7.

The fourth example of the power supply lines in the imaging sensor 10 includes a power supply source 44 arranged parallel to the power supply source 42. The power supply source 42 and the power supply source 44 supply the power supply voltage Vdd to each of the pixels 30, 32, and 34 via power supply lines 418, 416, and 414, respectively. The power supply lines 418, 416, and 414 are formed so that portions between the power supply source 42 and the respective pixels 30, 32, and 34 (the light-receiving elements 120, 122, and 124) are substantially identical in shape on the per-color basis and portions between the power supply source 44 and the respective pixels 30, 32, and 34 are substantially identical in shape on the per-color basis. Each of the power supply lines 414, 416, and 418 is formed to extend from an end of the power supply source 42, which is substantially parallel to the main-scanning direction, and from an end of the power supply source 44, which is substantially parallel to the main-scanning direction, in a direction substantially orthogonal to the main-scanning direction.

Thus, the fourth example of the power supply lines in the imaging sensor 10 can advantageously reduce voltage drop by reducing variation in line impedance between the colors, thereby reducing difference in characteristics between the colors.

Figure 8:
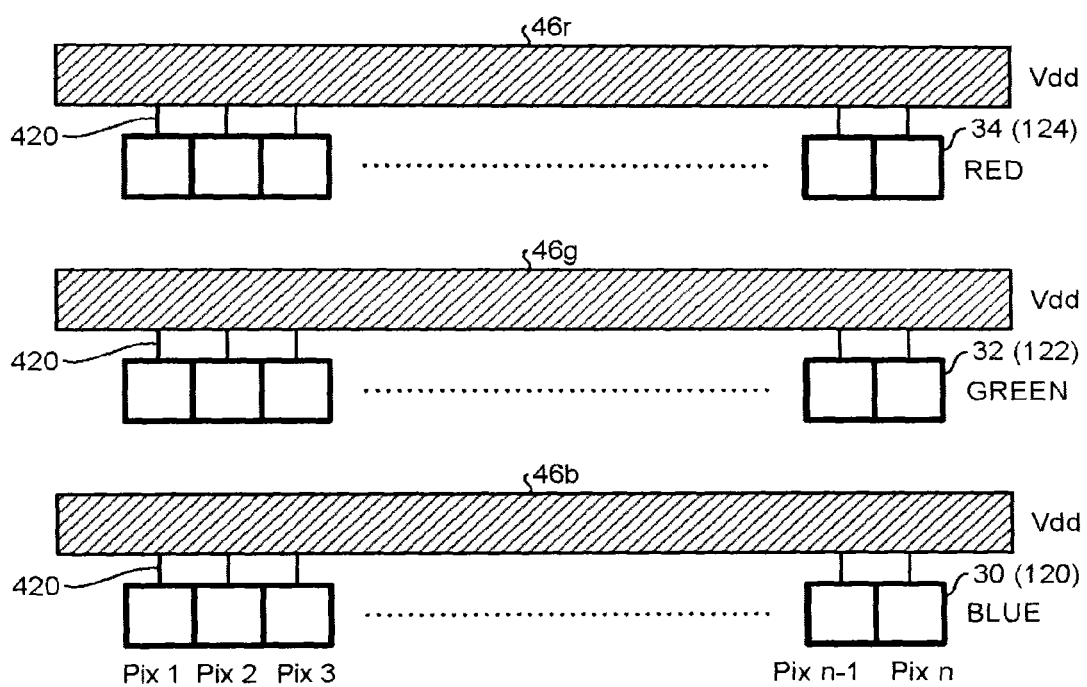
FIG. 8 is a diagram illustrating a fifth example of the power supply lines in the imaging sensor according to the embodiment.

FIG. 8 is a diagram illustrating a fifth example of the power supply lines in the imaging sensor 10 according to the embodiment. Note that control signal lines and the like are omitted from FIG. 8.

The fifth example of the power supply lines in the imaging sensor 10 includes power supply sources 46r, 46g, and 46b for red, green, and blue, respectively. In the fifth example of the power supply lines in the imaging sensor 10, an end of the power supply source 46g is between a pixel row (the pixels 34) for red and a pixel row (the pixels 32) for green. In the fifth example of the power supply lines in the imaging sensor 10, an end of the power supply source 46b is between the pixel row (the pixels 32) for green and a pixel row (the pixels 30) for blue. Put another way, each of the power supply sources 46g and 46b is arranged in a non-pixel region between the pixel rows. Power supply lines 420 via which the power supply voltage is supplied from the power supply sources 46b, 46g, and 46r to the pixels 30, 32, and 34, respectively, are arranged independently for each of the pixels.

The power supply lines 420 extending from the power supply sources 46b, 46g, and 46r to the pixels 30, 32, and 34 (the light-receiving elements 120, 122, and 124), respectively, are formed to be substantially identical in shape. Each of the power supply lines 420 is formed to extend from an end of a corresponding one of the power supply sources 46r, 46g, and 46b, which are substantially parallel to the main-scanning direction, in a direction substantially orthogonal to the main-scanning direction. More specifically, the power supply lines 420 for all the pixels 30, 32, and 34 have substantially same line impedance and supply the power supply voltage Vdd independently of each other. Accordingly, the pixels 30, 32, and 34 will not experience voltage drop caused by an electric current flowing through the other pixels. Thus, according to the fifth example of the power supply lines in the imaging sensor 10, the power supply voltage Vdd is distributed homogeneously in each of the main-scanning direction and the sub-scanning direction. The configuration of the fifth example of the power supply lines in the imaging sensor 10 is feasible by virtue of that a linear image sensor has gaps between pixel rows. This configuration is not efficiently feasible in an area image sensor.

The configuration of the power supply lines in the imaging sensor 10 is not limited to those of the first to fifth examples. The configurations of the first to fifth examples may be used in an arbitrary combination.

Figure 9:
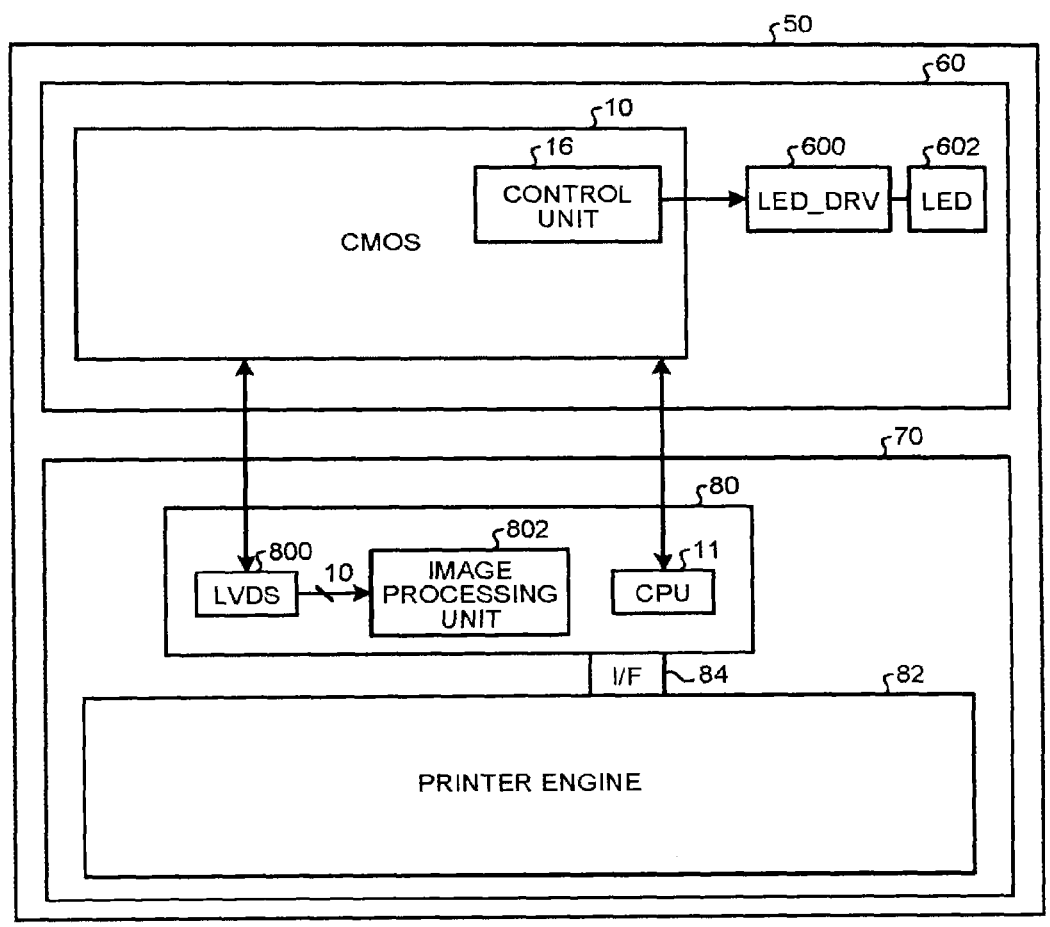
FIG. 9 is a diagram illustrating an overview of an image forming apparatus including an image reading device including the imaging sensor.

An image forming apparatus including an image reading device including the imaging sensor 10 according to an embodiment is described below. FIG. 9 is a diagram illustrating an overview of an image forming apparatus 50 including an image reading device 60 including the imaging sensor 10. The image forming apparatus 50 may be, for example, a copier or an MFP (multifunction peripheral) including the image reading device 60 and an image forming unit 70.

The image reading device 60 includes the imaging sensor 10, an LED (light-emitting diode) driver (LED_DRV) 600, and an LED 602, for example. The LED driver 600 drives the LED 602 in synchronization with a line synchronizing signal (hereinafter, "line sync signal") output from the control unit 16 or the like. The LED 602 irradiates an original document with light. Upon receiving light reflected from the original document in synchronization with the line sync signal or the like, multiple light-receiving elements of the imaging sensor 10 generate charges and start charge accumulation. After performing processing including A/D conversion, the imaging sensor 10 outputs processed image data to the image forming unit 70 via a parallel-serial converter circuit or the like.

The image forming unit 70 includes a processing unit 80 and a printer engine 82. The processing unit 80 and the printer engine 82 are connected to each other via an interface (I/F) 84.

The processing unit 80 includes an LVDS 800, an image processing unit 802, and the CPU 11. The CPU 11 controls various units, which include the imaging sensor 10, of the image forming apparatus 50. The CPU 11 (or the control unit 16) provides control so that the light-receiving elements start generating charges, each of which depends on an amount of light received by the light-receiving element, substantially simultaneously.

The imaging sensor 10 outputs, for example, image data representing an image obtained by the image reading device 60 by performing reading, line sync signals, transfer clocks, and the like to the LVDS 800. The LVDS 800 receives the image data, the line sync signals, the transfer clocks, and the like and converts the image data and the like into 10-bit parallel data. The image processing unit 802 performs image processing on the converted 10-bit parallel data and outputs the processed image data and the like to the printer engine 82. The printer engine 82 receives the image data and the like and performs printing using the image data.

The image forming apparatus 50 includes the image reading device 60 including the imaging sensor 10 as described above. Because the power supply lines are identical in length (shape) between the power supply source and the pixels at least on a per-color basis, the image forming apparatus 50 is capable of preventing unwanted position-dependent variation or, more specifically, variation depending on a pixel position in a pixel row of each color, of the power supply voltage supplied to the light-receiving elements.

According to an aspect of the present invention, an imaging sensor is capable of preventing unwanted position-dependent variation or, more specifically, variation depending on a position of a pixel in a row of pixels of each color, of power supply voltage supplied to light-receiving elements.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging sensor comprising:
   multiple light-receiving elements for multiple colors configured to conduct photoelectric conversion, the light-receiving elements of each of the colors being positioned along one direction; and
   multiple power supply lines configured to supply a power supply voltage from a power supply source to the light-receiving elements,
   wherein portions of the multiple power supply lines, extending between the power supply source and respective light-receiving elements, are substantially identical in shape on at least a per-color basis.

2. The imaging sensor according to claim 1, wherein
   the multiple power supply lines are formed to extend from an end of the power supply source in a direction substantially orthogonal to the one direction, and
   the power supply source is disposed so as to extend substantially parallel to the one direction.

3. The imaging sensor according to claim 1, wherein
   the multiple power supply lines are formed to extend from each of multiple ends of the power supply source in a direction substantially orthogonal to the one direction, and
   the power supply source is disposed so as to extend substantially parallel to the one direction.

4. The imaging sensor according to claim 1, wherein at least any one of ends of the power supply source is formed between any one of the multiple light-receiving elements for a first color of the multiple colors and any one of the multiple light-receiving elements for a second color of the multiple colors.

5. The imaging sensor according to claim 1, wherein the multiple power supply lines includes an independent power line for each of the multiple light-receiving elements.

6. The imaging sensor according to claim 1, further comprising:
   multiple A/D converters configured to convert electronic signals, the electronic signals being obtained by the multiple light-receiving elements by conducting the photoelectric conversion, into digital signals; and
   other multiple power supply lines other than the multiple power supply lines, the other multiple power supply lines being configured to supply the power supply voltage from the power supply source to each of the multiple A/D converters and formed to be substantially identical in shape.

7. The imaging sensor according to claim 1, further comprising:
   multiple amplifiers configured to amplify electronic signals, the electronic signals being obtained by the multiple light-receiving elements by conducting the photoelectric conversion; and
   other multiple power supply lines other than the multiple power supply lines, the other multiple power supply lines being configured to supply the power supply voltage from the power supply source to each of the multiple amplifiers and formed to be substantially identical in shape.

8. An image reading device according to claim 1, the image reading device comprising the imaging sensor of claim 1.

9. An image forming apparatus according to claim 8, the image forming apparatus comprising:
   the image reading device of claim 8; and
   an image forming device configured to form an image obtained by the image reading device.

10. An alignment method of an imaging sensor, the imaging sensor including multiple light-receiving elements for multiple colors configured to conduct photoelectric conversion, the method comprising:
    positioning the light-receiving elements of each of the colors along one direction, and
    positioning multiple power supply lines to supply a power supply voltage from a power supply source to the light-receiving elements,
    wherein portions of the multiple power supply lines, extending between the power supply source and respective light-receiving elements, are substantially identical in shape on at least a per-color basis.

11. An imaging sensor comprising:
multiple light-receiving means for multiple colors configured to conduct photoelectric conversion, the light-receiving means of each of the colors being positioned along one direction; and
multiple power supply means configured to supply a power supply voltage from a power supply source to the light-receiving means,
wherein portions of the multiple power supply means, the between the power supply source and respective light-receiving means, are substantially identical in shape on at least a per-color basis.

12. The image sensor according to claim 1, wherein the multiple light-receiving elements include multiple light-receiving photoelectric elements.

13. The image sensor according to claim 1, wherein the multiple light-receiving elements include multiple photodiodes.

14. The image sensor according to claim 9, wherein the image forming device includes:
processing circuitry, and
a printer engine.

15. The image sensor according to claim 1, wherein the power supply source includes a plurality of power supply sources each disposed so as to extend substantially parallel to the one direction.

16. The image sensor according to claim 15, wherein the multiple power lines are formed to extend from a first of the plurality of power supply sources to a second of the plurality of power supply sources.

17. The image sensor according to claim 15, wherein
a first of the plurality of power supply sources is formed between the multiple light-receiving elements of a first color of the multiple colors and the multiple light-receiving elements for a second color of the multiple colors, and
a second of the plurality of power supply sources is formed between the multiple light-receiving elements of the second color of the multiple colors and the multiple light-receiving elements for a third color of the multiple colors.

18. The image sensor according to claim 17, wherein
the first of the plurality of power supply sources supply the power supply voltage to the multiple light-receiving elements of the first color, and
the second of the plurality of power supply sources supply the power supply voltage to the multiple light-receiving elements of the second color.

19. The image sensor according to claim 17, wherein
the first of the plurality of power supply sources supply the power supply voltage to the multiple light-receiving elements of the first color,
the second of the plurality of power supply sources supply the power supply voltage to the multiple light-receiving elements of the second color, and
a third of the plurality of power supply sources supply the power supply voltage to the multiple light-receiving elements of the third color.

* * * * *